I. FRIED.
CLASP.
APPLICATION FILED JUNE 7, 1916.
1,197,117.  Patented Sept. 5, 1916.
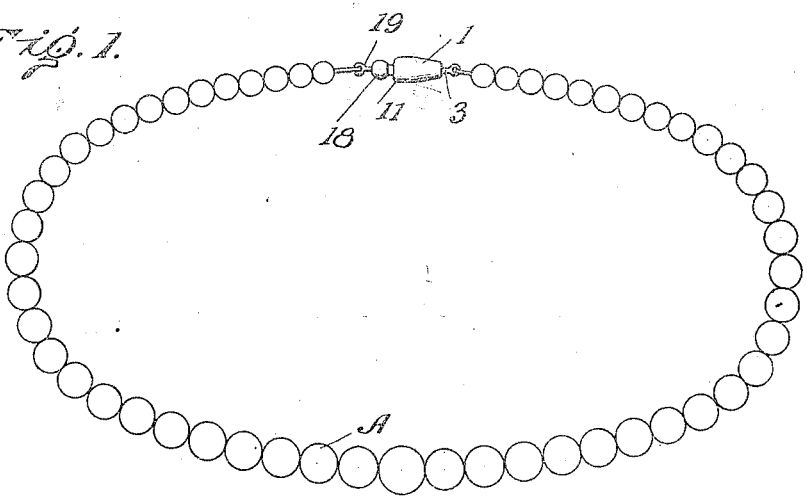
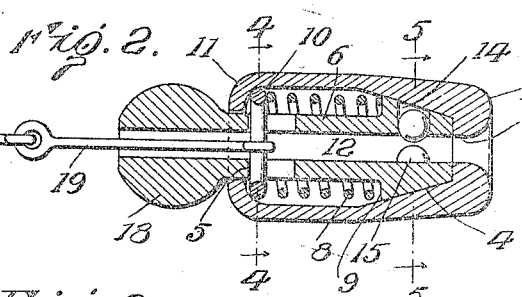
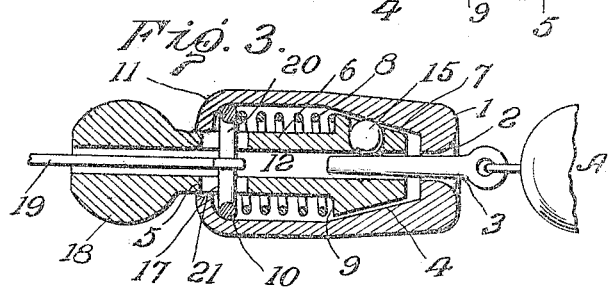
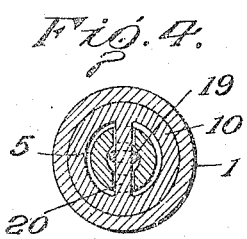
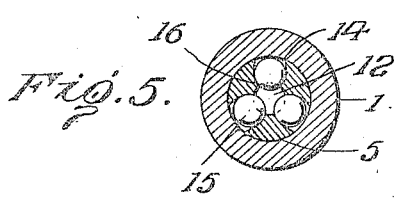
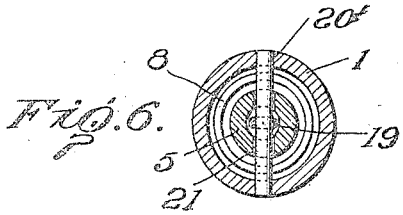
Inventor
Ignatius Fried
By his Attorneys

UNITED STATES PATENT OFFICE.

IGNATIUS FRIED, OF MOBILE, ALABAMA.

CLASP.

1,197,117.

Specification of Letters Patent.

Patented Sept. 5, 1916.

Application filed June 7, 1916. Serial No. 102,169.

*To all whom it may concern:*

Be it known that I, IGNATIUS FRIED, a citizen of the United States, residing in Mobile, in the county of Mobile and State of Alabama, have invented certain new and useful Improvements in Clasps, of which the following is a specification.

This invention relates more particularly to a clutch or clasp for use with necklaces or bracelets for securely holding the ends thereof together.

The object of the invention is to provide a simple clutch device which will permit the ends of a necklace or the like to be readily connected together, and which will prevent any unintentional release thereof.

A further object of the invention is to provide a clasp of this nature with means for attaching the necklace thereto, and having a release member which may be operated independently of the necklace attaching means, and which may be rotated relatively to the remainder of the clasp for preventing twisting of the necklace.

Other and further objects of the invention will in part be obvious and will in part be pointed out by reference to the accompanying specification and the drawings forming a part thereof in which like characters of reference are used to indicate like parts throughout the several views.

In the accompanying drawings, Figure 1 is a perspective view showing the clasp in position. Fig. 2 is a longitudinal section of the clutch member. Fig. 3 is a longitudinal section of the clutch member with the coöperating pin in position therein. Fig. 4 is a transverse section on the line 4—4 of Fig. 2. Fig. 5 is a transverse section on the line 5—5 of Fig. 2. Fig. 6 is a transverse section illustrating a slightly modified form of the invention.

Referring more particularly to the drawings, the improved clasp comprises a casing 1 preferably cylindrical in shape, having an opening 2 through one end thereof. The walls of the opening may be flared outwardly to provide a trumpet-shaped guide to permit the ready insertion of the pin 3. The casing is also provided with an interiorly inclined or conical face which may be concave or convex if desired. Mounted within the casing is a carrier 5 having a central portion 6 provided at one end with an enlarged head having a conical surface 7 coöperating with the conical face of the casing. The carrier is normally held in engagement with the conical face of the casing by a spring 8, surrounding the central portion of the carrier, and having one end thereof in engagement with the shoulder 9 and the opposite end in engagement with the ring 10 which in turn abuts against the end 11 of the casing inturned in any suitable manner as by spinning or the like. A central opening 12 having approximately the same diameter as the opening through the casing with which it is adapted to aline extends longitudinally throughout the entire length of the carrier. Formed in the carrier adjacent one end is a plurality of angularly disposed pockets 14 having their axes intersecting the axis of the central opening. While I have shown three of these pockets it is obvious that there may be any desired number, each containing a gripping device 15 which may be either cylindrical or spherical in shape, and which is held in place by the contracted end 16 of the pockets. The inturned end of the casing has an opening 17 through which the central portion of the carrier is adapted to project, the projecting portion having formed thereon an operating knob or head 18.

It will be obvious that one end of the necklace A may be connected to the pin 3 in any desired manner, the opposite end being secured to the clutch member by means of the link 19 extending partially through the longitudinal opening in the carrier and attached in any suitable manner to the cross bar 20 carried by the ring member 10. In order to accommodate the cross bar 20, the carrier has formed therein slots 21 through which the cross bar passes. By reason of this slotted construction it is possible to operate the carrier independently of the necklace to release the pin 3, the slots being of such length as to permit movement of the carrier a sufficient distance to effect this release. With this construction the carrier together with the ring member may be rotated relatively to the casing 1 so as to prevent any twisting of the necklace.

From the foregoing it is believed that the operation of the device will be apparent. With the parts in the position shown in Fig. 2, the pin may be inserted by forcing the same through the central opening in the head of the casing into engagement with the gripping devices 15, thereby causing the same to be forced into engagement with the inclined face 4 of the casing. Continued pressure on the pin will move the carrier longitudinally against the action of the spring 8, this movement allowing the gripping devices to be laterally projected away from the central opening of the carrier to permit passage of the pin. Upon now attempting to withdraw the pin the engagement thereof with the gripping devices will cause them to ride down the conical face of the casing, such movement being assisted by the spring 8. Movement in this direction will force the gripping devices laterally toward the central opening of the carrier thereby securely clutching the pin in position therein. When it is desired to release the pin to unclasp the necklace, this may be readily accomplished by pulling on the head 18 and withdrawing the carrier against the action of the spring.

If desired, the ring may be entirely dispensed with and the cross bar 20' constructed as shown in Fig. 6 with the ends thereof secured within the body of the casing. In both of these forms the cross bar passes through the slots in the carrier to permit longitudinal movement thereof independently of any movement of the necklace. This feature is quite material, as otherwise an unintentional pull or strain on the necklace might effect the release of the clutch.

While I have described the preferred embodiment of my invention it will be obvious that changes may be made therein within the scope of the appended claims.

Having thus described my invention, what I claim is:—

1. The combination with a necklace, of a clutch, comprising a casing, a spring-pressed ball-carrier movable endwise in the casing, a pin attached to one end of the necklace and adapted to engage the clutch, and a cross-bar within the casing to which the opposite end of the necklace is attached and relatively to which the ball-carrier is movable endwise in the casing.

2. In a clutch for necklaces, the combination with a casing having an interiorly inclined face, of a carrier movable longitudinally with regard to said casing, gripping means carried by said carrier and coöperating with said inclined face, said carrier having openings formed therein, and a cross bar passing through said openings and adapted to be attached to one end of the necklace and relatively to which the carrier is free to move endwise in the casing.

3. In a clutch for necklaces, the combination with a casing having an interiorly inclined face, of a carrier movable longitudinally with relation to the casing, gripping devices movable with the carrier and coöperating with said inclined face, said carrier having slots formed therethrough, and a cross bar within the casing extending through said slots, said cross bar being adapted to be secured to the necklace.

4. In a clutch for necklaces, the combination with a casing having an interiorly inclined face, of a carrier movable longitudinally with relation to the casing, gripping devices movable with the carrier and coöperating with said inclined face, said carrier having slots formed therethrough, a ring surrounding said carrier, and a cross bar carried by the ring and extending through said slots, said cross bar being adapted to be secured to one end of the necklace.

In testimony whereof, I have hereunto subscribed my name.

IGNATIUS FRIED.